United States Patent Office 2,851,464
Patented Sept. 9, 1958

2,851,464
PRODUCTION OF CHLOROTHIOPHENE

George McCoy, Philadelphia, and Charles E. Inman, Roslyn, Pa., and Glendon D. Kyker, Chattanooga, Tenn., assignors to Pennsalt Chemicals Corporation, a corporation of Pennsylvania No Drawing. Application October 4, 1955
Serial No. 538,511

6 Claims. (Cl. 260—332.5)

This invention relates to the production of chlorothiophenes and more particularly to the production of chlorothiophenes substantially free of chlorinated thiophene addition products.

The present application is a continuation-in-part of pending application Serial No. 269,323 and of application Serial No. 269,324, now abandoned, both filed January 31, 1952.

In the preparation of chlorothiophenes it is the practice to directly chlorinate thiophene and then separate the chlorothiophenes from the chlorination product. However, during the chlorination a substantial quantity of chlorinated thiophene addition products are formed, such addition products at times being as much as 20% of the chlorinated product depending on the conditions of chlorination. In order to increase the yield of the chlorothiophenes obtained it has been the practice to break down these addition products by pyrolysis alone or by heating in the presence of a strong caustic solution such as water or alcoholic solutions of NaOH or KOH. Through this treatment HCl is split out of the addition product and the corresponding chlorothiophene formed, the chlorothiophene formed depending on the addition products which are dehydrochlorinated. Since the addition products are generally a mixture of compounds such as tetra, penta, and hexa chlorothiolanes and chlorothiolenes, the resulting chlorothiophenes obtained are a mixture of chlorothiophenes. In the mixture of addition products tetrachlorothiolane is generally present in the greatest amount.

Though the overall yield of chlorothiophene may be increased by straight pyrolysis or by heating in the presence of caustic, these procedures themselves are not entirely satisfactory. Where caustic is employed to cause the decomposition of the addition products, the caustic material together with the resulting salts formed must thereafter be removed. Where the decomposition of the addition products is brought about by heat alone, the high temperature necessary to obtain any appreciable rate of decomposition causes the production of undesirable tarry materials. Furthermore, the cost of heating the chlorination product to the higher temperature necessary to cause appreciable dehydrochlorination is objectionable.

We have now discovered that by carrying out the pyrolytic dehydrochlorination of the addition chlorination products in the presence of activated carbon, the rate of dehydrochlorination to the corresponding chlorothiophene for any given temperature can be substantially increased. Also the temperature required to convert the addition products to chlorothiophene is substantially less when the reaction is carried out in the presence of activated carbon. Thus, for example, whereas appreciable dehydrochlorination will occur with tetrachlorothiolane, when heated in the presence of activated carbon to give dichlorothiophene, at temperatures as low as 143° C. and rapid dehydrochlorination occurs at 165° C.; without the presence of activated carbon dehydrochlorination does not start until a temperature of about 190° C. has been reached and a temperature of about 220° C. is necessary before the dehydrochlorination is as rapid as that occurring in the presence of activated carbon at 143° C.

Though decomposition of the addition products to chlorothiophenes can be obtained by carrying out the dehydrochlorination at temperatures as low as 143° C., we prefer, in practicing our invention, to heat the chloro addition products to a temperature of about 160° C. or greater since at these higher temperatures the dehydrohalogenation is more rapid. There is little advantage, however, in going to temperatures much in excess of about 200° C. The temperature should preferably not exceed 260° C. since at temperatures much in excess of 260° C. tarry side reaction products tend to form.

In practicing our present invention the thiophene may be chlorinated in any suitable manner. The chlorination proceeds readily and rapidly at room temperatures. The resulting chlorination product is heated in the presence of activated carbon to break down the chloro addition products to the chlorothiophenes which can then, if desired, be separated by fractionation. The chlorination of the thiophene and the decomposition of the addition products can be carried out simultaneously, if desired, by chlorinating the thiophene in the presence of activated carbon at a temperature in excess of about 143° C.

If the chloro addition product is substantially pure tetrachlorothiolane dehydrochlorination, in the presence of activated carbon as described, will yield substantially pure dichlorothiophene and HCl. The evolved HCl, which is preferably absorbed in water after treatment to remove any entrained organics, may be used or sold as a high quality muriatic acid since substantially no impurities are present. However, in practicing the present invention it is generally preferred to treat the reaction mass resulting from the chlorination of thiophene, consisting of a mixture of chlorothiophenes and chlorinated thiophene addition products, with activated carbon at elevated temperatures as described, to convert all of the addition products to chlorothiophenes. These chlorothiophenes may then be separated by fractionation if desired.

The chlorination of thiophene may of course be done in the presence of activated carbon, if desired. This may be either at a temperature below that required to dehydrochlorinate the addition products, such at about 30° C., and the temperature then raised to above 143° C. to convert the addition products to chlorothiophenes or the chlorination and dehydrohalogenation can be carried out simultaneously by chlorinating, as described, in the presence of activated carbon at a temperature in excess of 143° C.

The following examples are given to better illustrate the practice of our invention. It is understood, however, that these examples are given by way of illustration only and are not intended in any way to limit the scope of the invention.

Example 1

10 grams of tetrachlorothiolane was heated in a small distillation flask to 180° C. There was at this temperature a very slow evolution of HCl from the molten mass. On addition of 1 gram of Columbia Activated Carbon SXW, HCl was given off rapidly. Heating was continued at reflux temperature until no further evolution of HCl was apparent. The resulting product on distillation from the flask was found, after analysis, to be substantially pure dichlorothiophene.

Example 2

5 grams of tetrachlorothiolane was mixed with 5 grams of dichlorothiophene. The resulting mixture was then treated in the manner described in the preceding example. The final product, on analysis, was found to be substantially pure dichlorothiophene.

Example 3

5 grams of hexachlorothiolane was treated in a small flask equipped with a reflux condenser to 230° C. at which temperature refluxing occurred. A small amount of HCl was liberated indicating slight decomposition of the hexachlorothiolane. 1 gram of Columbia Activated Carbon SXW of 6–8 mesh was added. Immediately there was a rapid evolution of HCl and the vapor temperature dropped to 175° C. This temperature was maintained for a few minutes, but as the amount of HCl evolved decreased the temperature slowly rose. After the two hours the HCl evolved was nearly negligible and the temperature had risen to 228° C. Further addition of activated carbon caused no further release of HCl indicating that the reaction had gone to substantial completion. The product on analysis was found to be tetrachlorothiophene.

Example 4

Thiophene was chlorinated with 2 mols chlorine per mol thiophene at a temperature of about 30° C. for one hour. The chlorination product was then heated in the presence of activated carbon at a temperature of 146 to 172° C. in the absence of chlorine for about four and a half hours. The product was then fractionated and found to consist, on the basis of total crude, of about 7% monochlorothiophene, 59% dichlorothiophene, and 30% trichlorothiophene, the remaining 4% being still pot hold up which, after collection, was found to be substantially free of any addition chlorination products.

Example 5

Thiophene and chlorine, using about 2 mols of chlorine per mol of thiophene, were passed into a zone of activated carbon maintained at a temperature of about 160 to 180° C. About 43 grams of the resulting product was fractionated and on the basis of total crude yielded about 44.0% monochlorothiophene, 23% dichlorothiophene, 18% trichlorothiophene and 11% tetrachlorothiophene. The still pot hold up, which was about 4% as in Example 4, was found to be substantially free of any addition chlorination products.

In describing our invention several examples have been given. Obviously, many variations could be made differing substantially from the specific examples given and still utilizing our invention concept in the use of activated carbon for converting addition chlorination products of thiophene to chlorothiophenes. Many of these will immediately be apparent to one skilled in the art having the teaching of the present specification before them. Also, activated carbons other than those specifically mentioned can be employed. The invention, therefore, should not be limited to any specific illustration or illustrations which may have been employed to aid in its presentation, but should be interpreted only in the light of the full disclosure and the prior art.

Having thus described our invention, we claim:

1. The process of making dichlorothiophene comprising the step of heating tetrachlorothiolane in the presence of activated carbon at a temperature of at least 143° C. but not substantially above 260° C.

2. The process of making tetrachlorothiophene comprising the step of heating hexachlorothiolane in the presence of activated carbon to a temperature of at least 143° C. but not substantially above 260° C.

3. The process of converting chlorine addition products of thiophene resulting from the addition of chlorine to the thiophene ring to chlorothiophenes comprising the step of heating said addition products in the presence of activated carbon to a temperature of at least 143° C. but not substantially above 260° C.

4. The process of claim 3 wherein said temperature is within the range of about 160 to 260° C.

5. The process for preparing chlorothiophenes substantially free of chlorine addition products resulting from the addition of chlorine to the thiophene ring comprising the steps of heating the reaction product produced by ring-chlorinating thiophene to a temperature of at least 143° C., but not substantially above 260° C. in the presence of activated carbon.

6. The process of preparing chlorothiophenes comprising the step of ring-chlorinating thiophene in the presence of activated carbon at a temperature of at least 143° C., but not substantially above 260° C., thereby effecting simultaneously with the chlorination reaction, the dehydrochlorination of chlorine addition products resulting from the addition of chlorine to the thiophene ring.

References Cited in the file of this patent

FOREIGN PATENTS

| | | |
|---|---|---|
| 108,424 | Austria | Dec. 27, 1927 |
| 503,063 | Belgium | Nov. 5, 1951 |
| 955,816 | France | July 4, 1949 |
| 420,500 | Germany | Oct. 24, 1925 |

OTHER REFERENCES

Van Loon: Rec. trav. Chim. 56: 815–38 (1937) (pp. 819 and 835 in particular).

Hartough: "Thiophene and Its Derivatives," page 169 (1952).